(12) United States Patent
Prior

(10) Patent No.: US 8,061,484 B2
(45) Date of Patent: Nov. 22, 2011

(54) METHOD AND APPARATUS FOR MAINTAINING OIL PRESSURE

(75) Inventor: Gregory P. Prior, Birmingham, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 485 days.

(21) Appl. No.: 12/416,992

(22) Filed: Apr. 2, 2009

(65) Prior Publication Data

US 2010/0252367 A1 Oct. 7, 2010

(51) Int. Cl.
*F16N 17/00* (2006.01)
*F01M 1/02* (2006.01)

(52) U.S. Cl. ..................... 184/6.5; 123/196 R

(58) Field of Classification Search ............ 184/6.2, 184/6.5, 6.8, 6.12, 6.13; 123/196 R; 417/278, 417/435, 440; 137/38, 45, 46, 39
See application file for complete search history.

(56) References Cited

U.S. PATENT DOCUMENTS

| | | | | | |
|---|---|---|---|---|---|
| 3,635,604 | A | * | 1/1972 | Petersen et al. | 417/304 |
| 3,967,493 | A | * | 7/1976 | Murphy et al. | 73/652 |
| 3,982,794 | A | * | 9/1976 | Colovas et al. | 303/9.68 |
| 4,971,532 | A | * | 11/1990 | Slattery | 417/435 |
| 6,416,373 | B1 | * | 7/2002 | Kolb et al. | 440/88 R |
| 6,695,659 | B2 | * | 2/2004 | Kolb et al. | 440/88 L |
| 7,862,306 | B2 | * | 1/2011 | Staley et al. | 417/220 |

* cited by examiner

*Primary Examiner* — Michael Mansen
*Assistant Examiner* — Mark K Buse
(74) *Attorney, Agent, or Firm* — Quinn Law Group, PLLC

(57) ABSTRACT

An oil pump system is provided having a mechanism configured to receive oil, pressurize the oil, and output the pressurized oil. The oil pump system also includes an oil pump body configured to house the mechanism. A vent is defined by the body to purge air from the pump. Also, a device is arranged relative to the vent, and configured to close the vent when the pump body is subjected to g-forces up to a predetermined threshold magnitude. The device is additionally configured to open the vent when the pump body is subjected to g-forces exceeding the predetermined threshold magnitude, wherein air otherwise received by the pump mechanism with the oil, captured within the mechanism, and outputted with the pressurized oil is purged.

14 Claims, 5 Drawing Sheets

METHOD AND APPARATUS FOR MAINTAINING OIL PRESSURE

TECHNICAL FIELD

The present invention relates to maintaining oil pressure, and, more particularly, to maintaining oil pressure via an oil pump.

BACKGROUND OF THE INVENTION

A large percentage of motor vehicles employ wet-sump engine lubrication systems where a fluid pump is positioned to draw oil from an engine oil sump in order to provide circulation of pressurized oil throughout the engine. To that end, the fluid pump generally employs an oil pick-up tube that is submerged in the sump oil, intended to provide continuous supply of oil to the engine.

Vehicles employing wet-sump engine lubrication are sometimes used in racing. During a racing event, a vehicle may be called upon to perform various aggressive maneuvers, such as cornering, acceleration and braking, that may generate high g-forces. High g-forces encountered in racing, at times, may be sufficient to transfer engine oil from its usual distribution at the bottom of the sump to being concentrated in corners or near walls of the sump. Such transfer of sump oil may uncover the oil pick-up tube, which may lead the oil pump to ingest air and interrupt supply of oil to the pump. Ingestion of air by the pump pick-up tube may, in turn, lead to a significant drop in oil pressure provided to the engine.

SUMMARY OF THE INVENTION

In view of the foregoing, an oil pump system is provided having a mechanism configured to receive oil, pressurize the oil, and output the pressurized oil. The oil pump system also includes an oil pump body configured to house the pump mechanism. A vent is defined by the oil pump body to purge air from the pump mechanism. Also, a device is arranged relative to the vent, and configured to close the vent when the pump body is subjected to g-forces up to a first predetermined threshold magnitude. The device is additionally configured to open the vent when the pump body is subjected to g-forces exceeding the first predetermined threshold magnitude, wherein air otherwise received by the pump mechanism with the oil, captured within the mechanism, and outputted with the pressurized oil is purged.

The oil pump body may also include an inlet side configured to receive oil and an oil outlet side configured to supply pressurized oil. The device may be arranged proximate the outlet portion. If the oil pump is employed as part of an engine lubrication system, the oil inlet side receives oil from a pickup structure, and the outlet portion supplies pressurized oil to the engine.

The device may include a solenoid configured to selectively close or open the vent. The device may also include a sensor configured to sense the g-forces and generate a signal indicative of the sensed g-forces. Furthermore, the device may include a controller configured to receive the signal indicative of the sensed g-forces and to actuate the solenoid to open the vent when the g-forces exceed the first predetermined threshold magnitude.

The sensor may be configured to generate the signal for a duration of the sensed g-forces. The controller may be configured to actuate the solenoid to open the vent when the g-forces are above a second predetermined threshold magnitude and the duration of the g-forces above the second predetermined threshold magnitude exceeds a predetermined duration.

The sensor may also be configured to sense a direction of the g-forces and to generate a signal indicative of the direction of the g-forces. In such a case, the controller may be configured to actuate the solenoid when the g-forces in a particular direction exceed the second predetermined threshold magnitude.

A method for maintaining oil pressure in an engine of a motor vehicle via the oil pump system is also provided.

The above features and advantages and other features and advantages of the present invention are readily apparent from the following detailed description of the best modes for carrying out the invention when taken in connection with the accompanying drawings.

DESCRIPTION OF THE PREFERRED EMBODIMENTS

Figure 1:
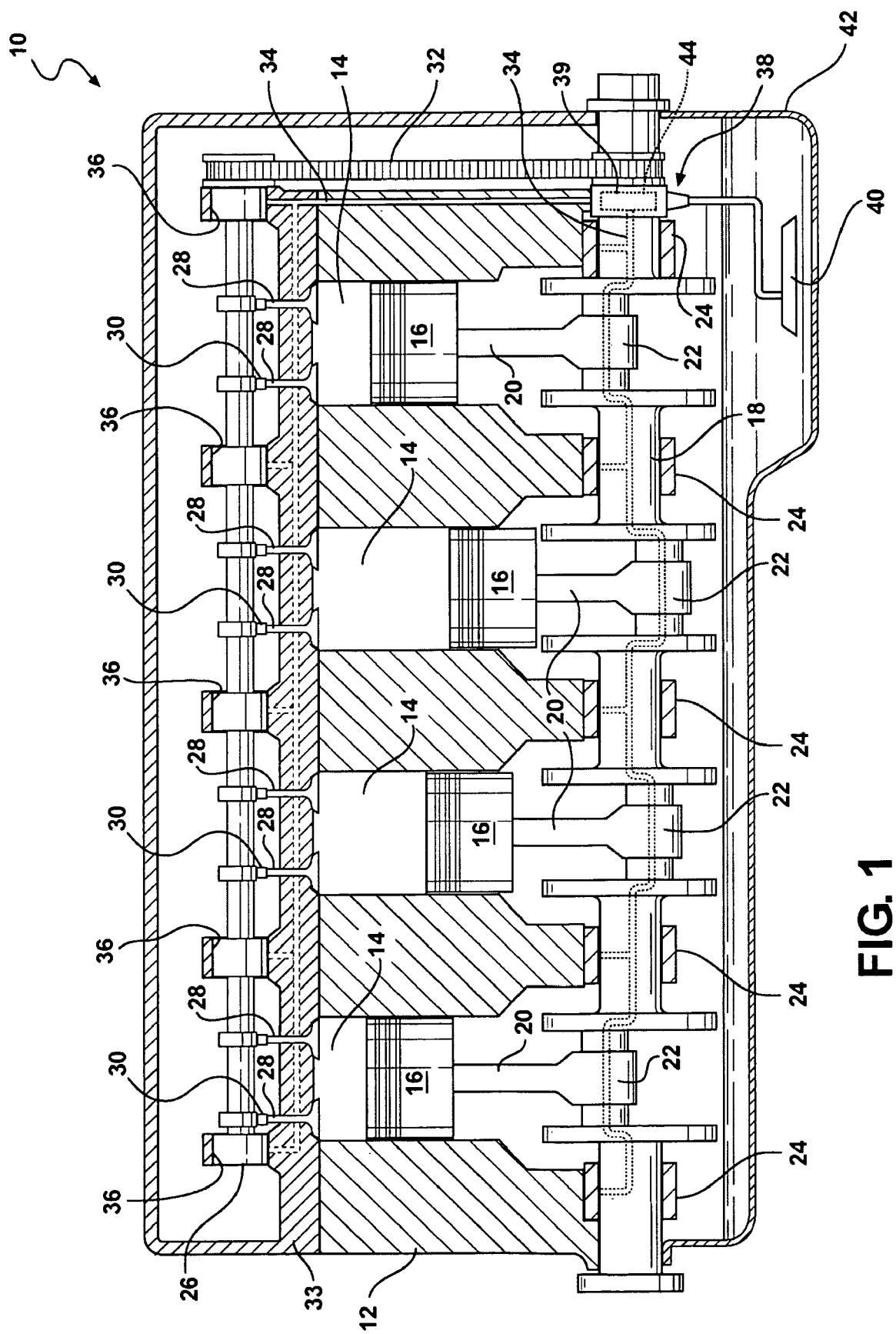
FIG. 1 is schematic partially cross-sectional illustration of a typical engine for a motor vehicle employing a lubrication system.

FIG. 1 shows an engine 10. Engine 10 includes a cylinder case 12 defining a plurality of cylinders 14, each operable to receive a piston 16 for reciprocal motion therein. Each piston 16 imparts torque to a crankshaft 18 via a connecting rod 20 as a result of force generated by combustion of an air-fuel mixture inside each respective cylinder 14. Each connecting rod 20 is rotationally supported on the crankshaft 18 via a rod bearing 22. The crankshaft 18 is rotationally supported in the cylinder case 12 via main bearings 24.

The engine 10 also includes at least one camshaft 26 for actuating a plurality of valves 28 to provide an air-fuel mixture intake to, and exhaust spent combustion gasses from the cylinders 14. The camshaft 26 actuates valves 28 via individual hydraulic valve lifters 30 configured to maintain proper valve lash. The camshaft 26 is driven by the crankshaft 18 via a coupling 32, such as a chain, a gear drive or a belt. As shown, the camshaft 26 is rotationally supported above a cylinder head 33 on camshaft bearings 36, but which may also be similarly supported inside the cylinder head 33 or inside the cylinder case 12, as is generally understood by those skilled in the art.

Engine 10 employs a lubrication system 34 consisting of fluid passages or galleries for supplying oil to rod bearings 22, main bearings 24, camshaft bearings 36, and to various other auxiliary mechanisms, such as, for example, a camshaft phaser (not shown). The fluid passages of lubrication system 34 are supplied with pressurized oil via an oil pump 38. The oil pump 38 employs a pick-up structure 40 projecting from the pump 38, and typically concluding with a steel mesh screen (not shown) to filter out debris, for receiving oil from an oil pan sump or crankcase 42.

The oil pump 38 has a body or casing 39 that houses a mechanism 44 driven by the crankshaft 18. Mechanism 44 is configured to pressurize and output oil received from the crankcase 42. The mechanism 44 pressurizes and pushes the oil through a filter (not shown) to rod bearings 22, main bearings 24, camshaft bearings 36, valve lifters 30 and other auxiliary mechanisms via passages of the lubrication system 34. A steady supply of pressurized lubricant is employed to prevent metal-to-metal contact that may generate high temperature, friction and eventual wear of moving parts, such as rod bearings 22, main bearings 24, camshaft bearings 36, and their respective supported components. Pressurized lubricant is also employed to maintain proper valve lash in engines with hydraulic lifters 30. Consequently, in order to sustain proper bearing lubrication and valve lash in engine 10, oil pressure needs to be within prescribed design parameters while the engine is running.

During high g-force vehicle maneuvers, such as aggressive cornering, acceleration and braking typically encountered in automobile racing, pick-up 40 may become momentarily uncovered due to oil sloshing around in the sump 42. During such maneuvers, engine operating parameters, such as temperature of oil and speed of the engine 10, also have an influence on the amount of oil slosh in the sump 42. Oil temperature typically rises as a function of engine speed and engine load. With a rise in oil temperature, oil viscosity typically decreases, which tends to cause increased oil sloshing in the sump 42, thus more readily uncovering the pick-up 40. When the pick-up 40 is uncovered, air may be ingested into the pump 38, and could thereby cause oil pressure in the lubrication system 34 to drop below design requirements. Even when ingested air is not sufficient to reduce oil pressure below design requirements, resultant air bubbles in the lubrication system 34 will still have to pass through bearings 22, 24, 36 and valve lifters 30, thereby disrupting the oil film before they are purged.

Configuration of the sump 42, as well as vehicle dynamic response to various maneuvers, i.e. body roll in corners, squat and dive during acceleration and braking, are all factors influencing a threshold magnitude of g-force at which the pick-up 40 will begin to ingest air. A threshold magnitude of such a g-force may be predetermined, and be considered a first threshold g-force magnitude. Furthermore, air ingestion by the pick-up 40 may be dependent on duration of time spent by the engine 10 above the predetermined threshold g-force and direction of g-force due to location of the pick-up 40 and shape of the sump 42. For example, sump 42 may be configured with internal baffles (not shown) to extend the duration of time that the pick-up 40 can be prevented from ingesting air. Therefore, pick-up 40 in a particular engine may be uncovered above a certain g-force magnitude during some vehicle maneuvers, such as during cornering, but not if a g-force of the same magnitude is encountered during acceleration or braking. Consequently, a second g-force threshold magnitude along with respective threshold time duration and direction of the g-force experienced by the engine 10 may be predetermined. Both the first and the second g-force threshold magnitudes would preferably be mathematically predetermined and empirically verified over the course of actual engine and/or vehicle testing. The first g-force threshold magnitude will typically be higher than the second g-force threshold magnitude.

Figure 2:
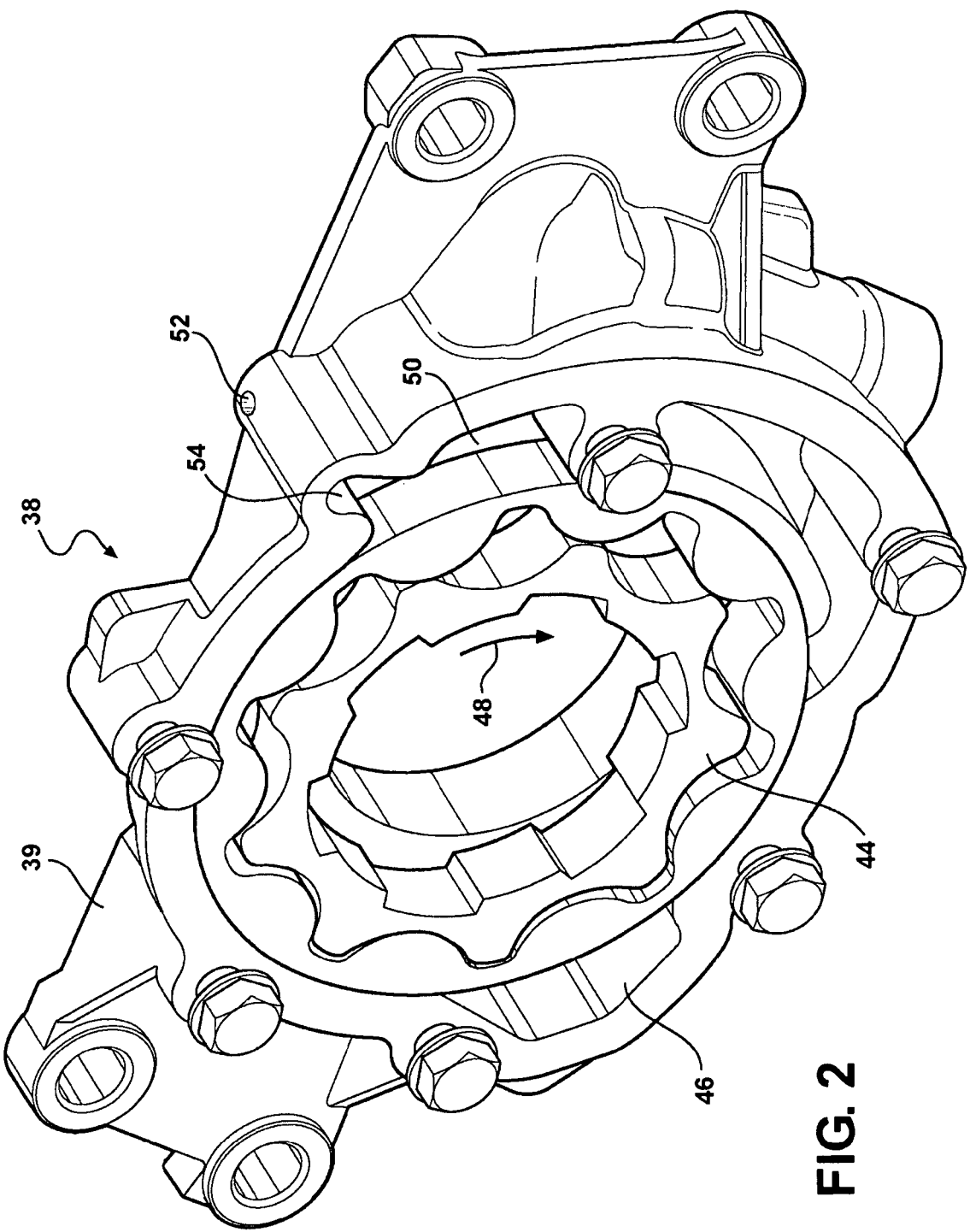
FIG. 2 is a schematic perspective view of an oil pump having a vent employed in the engine of FIG. 1.

FIG. 2 depicts oil pump 38 according to a preferred embodiment. Oil pump 38 includes body 39. Body 39 incorporates a pump inlet portion 46 by which oil is received into the mechanism 44 after being drawn by the pick-up 40 from the sump 42. As described in connection with FIG. 1, and shown in FIG. 2, mechanism 44 is rotationally driven by the crankshaft 18 in the direction represented by arrow 48 to force, and thus pressurize the oil. The pressurized oil is outputted through an outlet portion 50 to the lubrication system 34.

Figure 3:
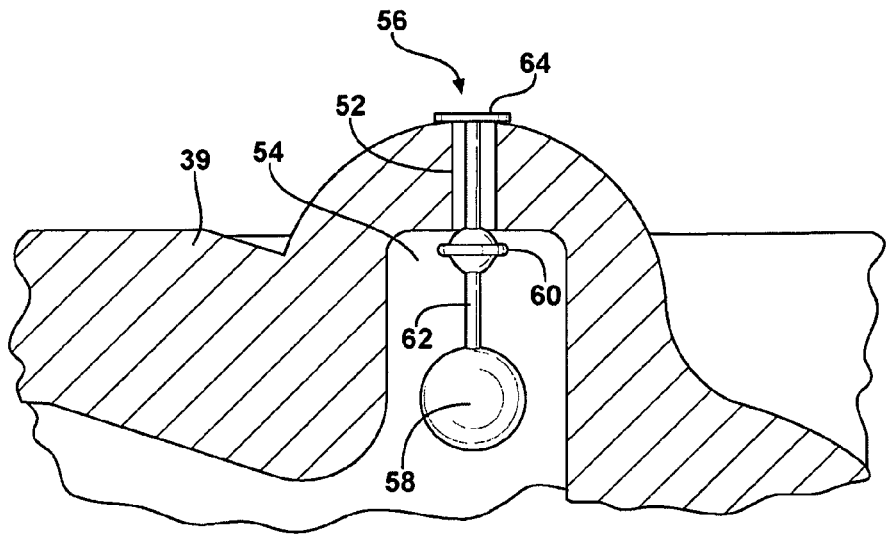
FIG. 3 is a schematic cross-sectional view of an oil pump employed in the oil pump system of FIG. 1 depicting a valve positioned at the vent of FIG. 2 when the engine is not running.
Figure 4:
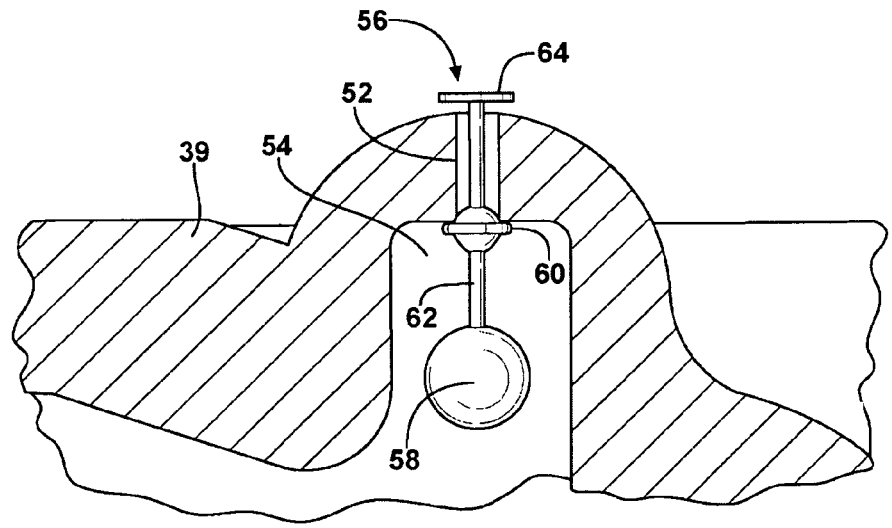
FIG. 4 is a schematic cross-sectional view of the oil pump shown in FIG. 3, depicting the vent closed by the valve when the engine is running and g-forces acting on the engine are at or below a predetermined threshold magnitude.
Figure 5:
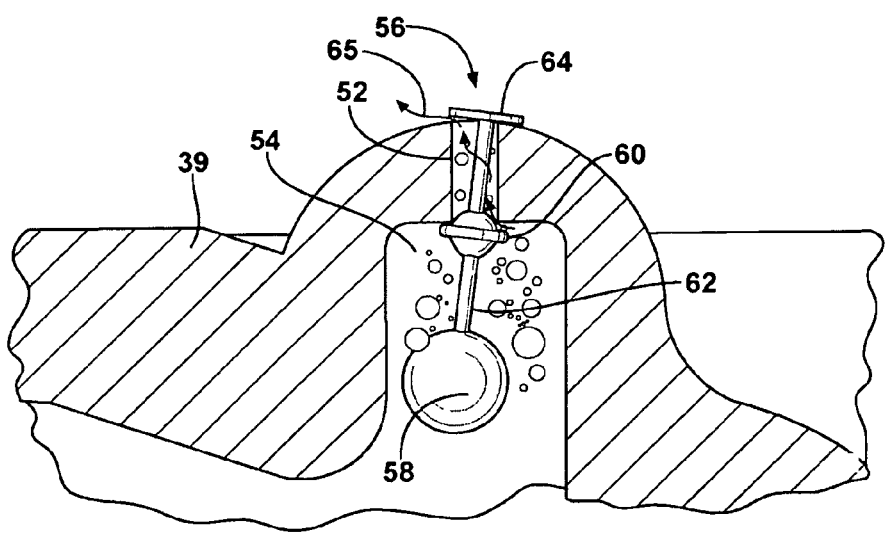
FIG. 5 is a schematic cross-sectional view of the oil pump shown in FIG. 4, depicting the vent opened by the valve when the engine is running and g-forces acting on the engine exceed the predetermined threshold magnitude.

Also shown in FIG. 2, a vent 52 is located proximate to a top section 54 of the outlet portion 50. The vent 52 is a passage preferably having a boundary of round cross-section, large enough to for air to pass through. The vent 52 is thus positioned in order to expel or purge air bubbles that may otherwise be captured within the mechanism 44 due to air ingestion by the pick-up 40 during high g-force vehicle maneuvers. FIGS. 3-5 show a valve 56 fitted inside the vent 52 that is configured to close the vent 52 when the pump 38 is subjected to g-forces that are at or below a predetermined threshold. The valve 56 is also configured to open the vent 52 when the pump 38 is subjected to g-forces above the predetermined threshold.

The valve 56 includes a weighted spherical member 58 that is connected to a seal flange 60 by a stem 62 (shown in FIGS. 3-5). The stem 62 preferably has a round cross-section having a smaller diameter than diameter of the vent 52, so that air may pass between the outer diameter of the stem 62 and boundary of the vent 52. The area and weight of spherical member 58 is specifically determined to be buoyed by the oil pressure generated by the pump 38. By being connected to the stem 62, the spherical member 58 weighs the valve 56 down to unseat the flange 60 when the engine 10, and hence the pump 38 are not running. When the engine 10 is not running, as shown in FIG. 3, a cap 64 connected to the stem 62 suspends the valve 56 inside the vent 52, and keeps it from dropping into the mechanism 44.

When the engine 10 is running, and the pump 38 is generating oil pressure, as shown in FIG. 4, while g-forces are at or below the predetermined threshold magnitude, as described in connection with FIG. 1, oil pressure pushes the valve 56 upward via the spherical member 58. As the valve 56 is pushed upward, the flange 60 seals the vent 52. When the engine 10 is running, and the pump 38 is generating oil pressure, but the g-forces are above the predetermined threshold magnitude, as shown in FIG. 5, the g-forces tilt the weighted spherical member 58 to unseat the flange 60. By unseating the flange 60, the valve 56 opens the vent 52 and permits the air bubbles ingested by the pick-up 40 to purge, as depicted by arrows 65.

Figure 6:
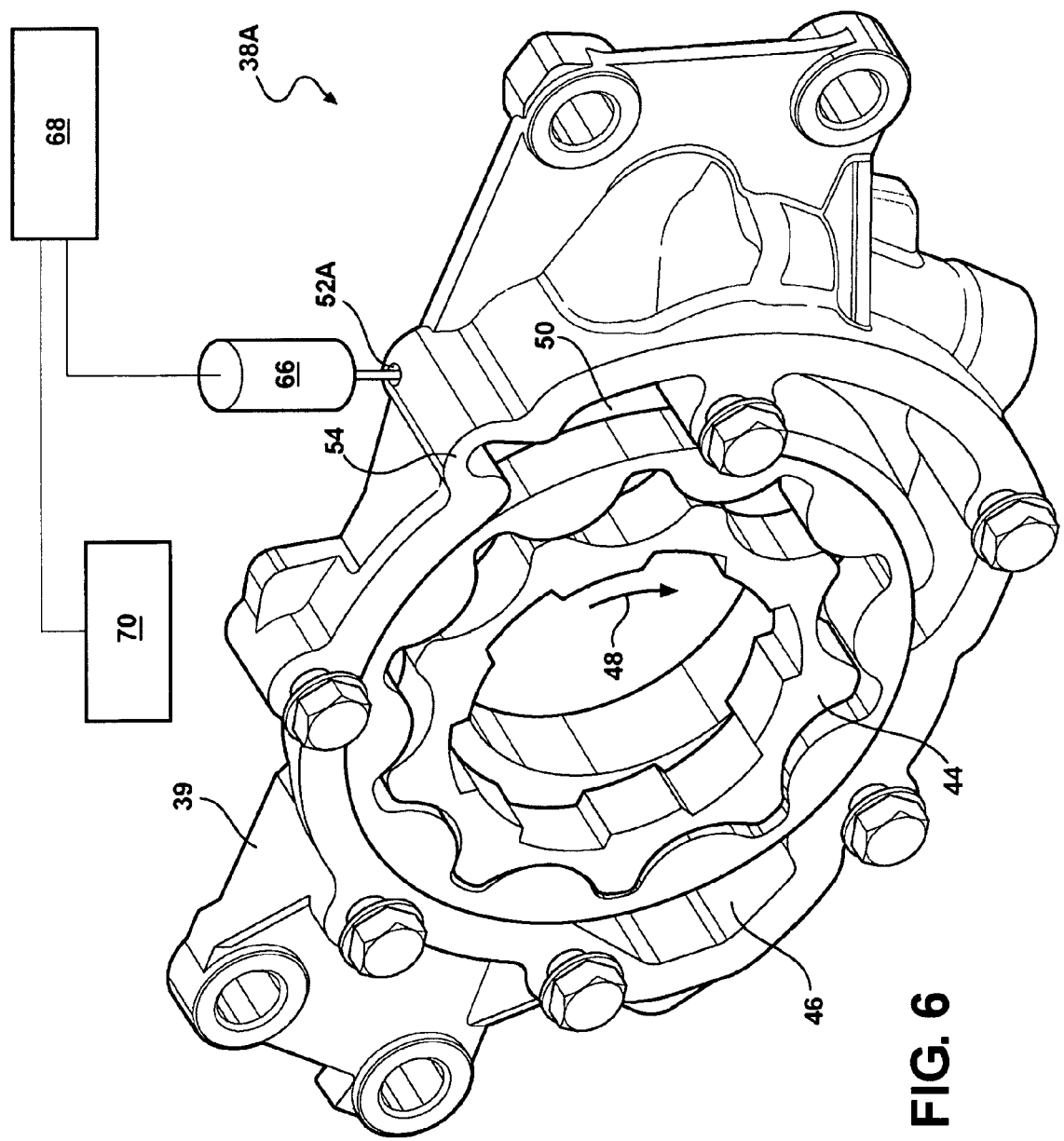
FIG. 6 is a schematic perspective view of an oil pump having a solenoid employed to open the vent.

FIG. 6 shows an oil pump 38A. The oil pump system 38A is in most aspects identical to the oil pump 38 described in relation to FIG. 2, and similarly functions to supply pressurized oil to the engine 10 of a vehicle. Hence, all elements of oil pump 38A that match the elements of oil pump 38 are labeled identically in FIG. 6. Oil pump 38A includes a vent 52A and a solenoid 66 that is configured to close the vent 52 when the pump 38 is subjected to g-forces at or below the predetermined threshold. The solenoid 66 is also configured to open the vent 52 when the pump 38 is subjected to g-forces above the predetermined threshold.

FIG. 6 also shows the solenoid 66 operatively connected to a controller 68 mounted on the vehicle relative to the pump 38A. The solenoid 66 is preferably configured to keep vent 52A normally closed. The controller 68 is operatively connected to a sensor 70, such as an accelerometer, as known by those skilled in the art. The sensor 70 is arranged relative to the engine 10 and configured to sense g-forces acting on the engine during vehicle maneuvers. The sensor 70 is additionally configured to generate a signal indicative of the sensed g-forces to be received by the controller 68. The controller 68 may communicate with the sensor 70 either via a wired connection, or wirelessly, via a radio frequency, in which case both the sensor and the controller will include complementary antennas (not shown), as is understood by those skilled in the art. The controller 68 is configured to receive signals from the sensor 70, and programmed to actuate the solenoid 66 to open the vent 52A when the sensed g-forces exceed the predetermined threshold.

The signal indicative of the sensed g-forces is generated continuously by the sensor 70. The sensor 70 is additionally configured to sense direction of the g-forces acting on the engine 10, and to communicate such data to the controller 68. The controller 68 is programmed to assess the time duration of the signal and the direction of the g-forces. The controller 68 is additionally programmed to actuate the solenoid 66 when the duration of g-force exceeding the predetermined threshold magnitude is longer than the predetermined threshold time duration in a particular specified direction, such as in circumstances described in relation to FIG. 1. The controller 68 may also be programmed to account for engine operating parameters, such as oil temperature and speed of engine 10, that influence sloshing of oil in the sump 42, in order to actuate the solenoid 66. Dedicated sensors are commonly provided in modern vehicle engines to sense and communicate such parameters to various vehicle control systems, and may be additionally configured to communicate their signals to the controller 68.

Figure 7:
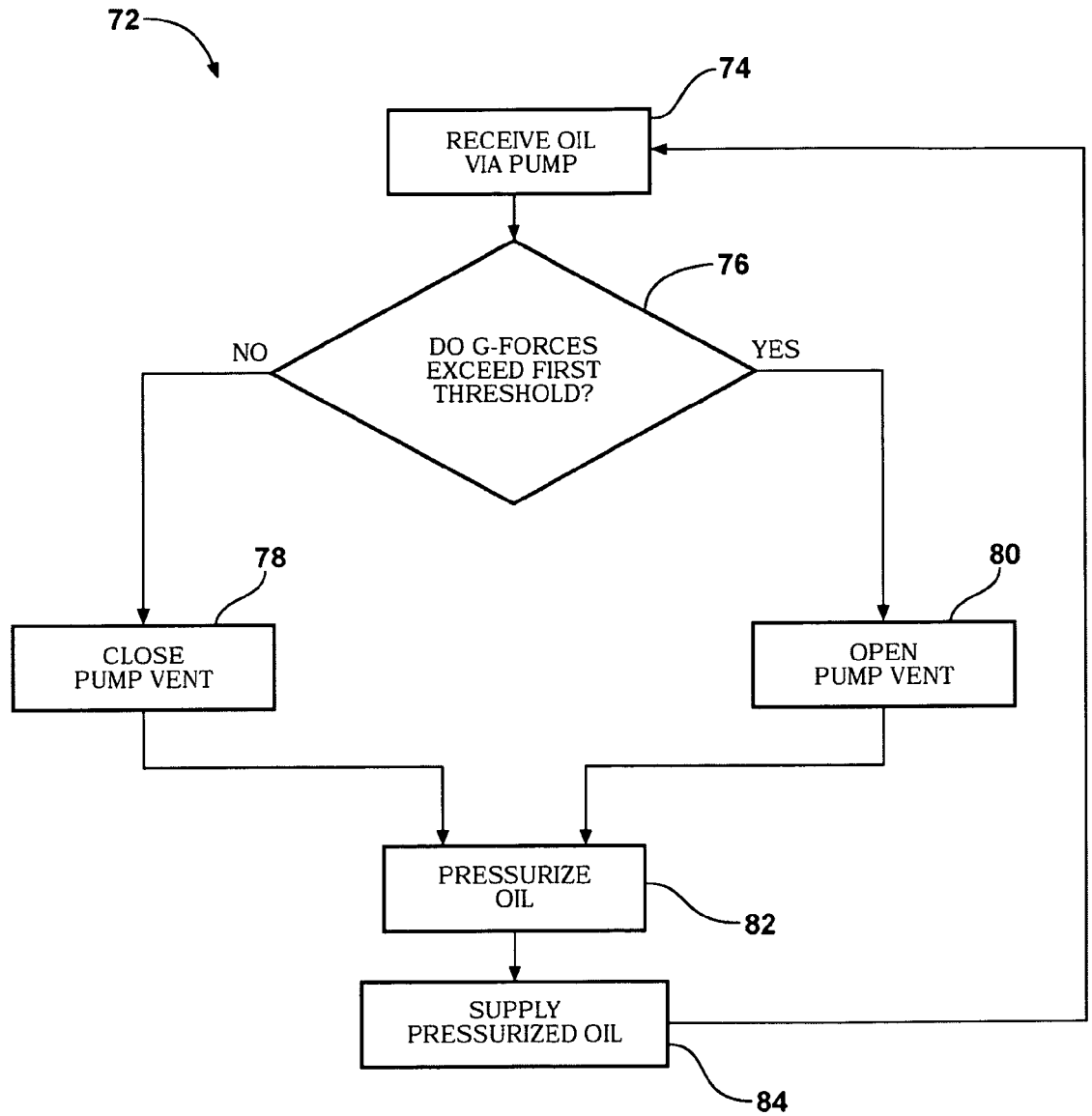
FIG. 7 schematically illustrates, in flow chart format, a method for maintaining oil pressure in an engine of a motor vehicle employing the oil pump shown in FIG. 6.

FIG. 7 depicts a method 72 for maintaining oil pressure inside engine 10 of a motor vehicle. The method 72 can best be described with reference to FIG. 6. According to the method 72, oil is received via oil pump 38. From frame 72, the method proceeds to frame 74, where it is determined via controller 68 whether g-forces acting on engine 10 and sensed by sensor 70 have exceeded a first predetermined threshold magnitude. If in frame 74 it is determined that the sensed g-forces do not exceed the first predetermined threshold magnitude, the method proceeds to frame 78, where vent 52A, depending on the default position of solenoid 66, is either closed or allowed to remain blocked. If in frame 74 it is determined that the sensed g-forces do exceed the first predetermined threshold magnitude, method 72 proceeds to frame 80.

Additional determinations may also be accomplished by controller 68 prior to method 72 advancing from frame 80 to frame 80. As described with respect to FIG. 6, a determination may be made whether duration of the g-forces exceeding the first predetermined threshold magnitude exceeds a predetermined duration. In such a case, if it is determined that duration of the g-forces exceeding the first predetermined threshold magnitude does not exceed the predetermined duration, method 72 would proceed to close vent 52A. If, on the other hand, it is determined that duration of the g-forces exceeding the first predetermined threshold magnitude exceeds the predetermined duration, method 72 may also determine via controller 68 whether the sensed g-forces in a particular direction exceed a second predetermined threshold magnitude. In such a case, if it is determined that the sensed g-forces in a particular direction do not exceed the second predetermined threshold magnitude, method 72 would proceed to close vent 52A. If, however, it is determined that the sensed g-forces in a particular direction exceed the second predetermined threshold magnitude, method 72 would proceed to open vent 52A.

After the chosen combination of above listed tasks is accomplished, the method advances to frame 80, where the oil is received by the oil pump 38A and is pressurized by the mechanism 44. The method then proceeds to frame 84, where the pressurized oil is supplied to the lubrication system 34 of the engine 10. After pressurized oil has been supplied to the engine 10, method 72 loops back to frame 74 to continue receiving oil by oil pump 38A. Because a running engine requires a steady supply of pressurized oil for reliable operation, method 72 continues to cycle through frames 74-84 as long as crankshaft 18 drives pump 38A.

While the best modes for carrying out the invention have been described in detail, those familiar with the art to which this invention relates will recognize various alternative designs and embodiments for practicing the invention within the scope of the appended claims.

The invention claimed is:

1. An oil pump system comprising:
   a pump mechanism configured to receive oil, pressurize the oil, and output the pressurized oil;
   a pump body configured to house the pump mechanism;
   a vent defined by the pump body, configured to purge air from the pump mechanism; and
   a device arranged relative to the vent, configured to close the vent when the pump body is subjected to g-forces up to a first predetermined threshold magnitude, and to open the vent when the pump body is subjected to g-forces having a magnitude that is above the first predetermined threshold magnitude, wherein air otherwise received by the pump mechanism with the oil, captured within the pump mechanism, and outputted with the pressurized oil is purged.

2. The oil pump system of claim 1, wherein the pump body further comprises an inlet portion configured to receive oil and an oil outlet portion configured to output pressurized oil, and the device is arranged proximate the outlet portion.

3. The oil pump system of claim 1, wherein the device comprises:
   a solenoid configured to selectively close or open the vent;
   a sensor configured to sense the g-forces and generate a signal indicative of the sensed g-forces; and
   a controller configured to receive the signal indicative of the sensed g-forces and to actuate the solenoid to open the vent when the sensed g-forces are above the first predetermined threshold magnitude.

4. The oil pump system of claim 3, wherein the sensor is configured to generate the signal for a duration of the sensed g-forces, and the controller is configured to actuate the solenoid when the g-forces are above a second predetermined threshold magnitude and the duration of the g-forces above the second predetermined threshold magnitude exceeds a predetermined duration.

5. The oil pump system of claim 4, wherein the sensor is configured to sense a direction of the g-forces and to generate a signal indicative of the direction of the g-forces; the controller being configured to actuate the solenoid when the g-forces in a particular direction exceed the second predetermined threshold magnitude.

6. An engine having a lubrication system, the lubrication system comprising:
   an oil sump; and
   an oil pump;

wherein the oil pump comprises:
- an oil pick-up structure configured to draw oil from the oil sump;
- a mechanism configured to receive oil from the oil pick-up structure, pressurize the oil, and provide the pressurized oil to the engine;
- a pump body configured to house the mechanism;
- a vent defined by the pump body, configured to purge air from the oil pump; and
- a device arranged relative to the vent, configured to close the vent when the engine is subjected to g-forces up to a first predetermined threshold magnitude, and to open the vent when the engine is subjected to g-forces that exceed the first predetermined threshold magnitude, wherein air otherwise received by the pump with the oil, captured within the mechanism, and provided with the pressurized oil to the engine, is purged.

7. The engine of claim 6, wherein the pump body further comprises an inlet portion configured to receive oil from the oil pick-up structure and an oil outlet portion configured to provide pressurized oil to the engine, and the device is arranged proximate the outlet portion.

8. The engine of claim 6, wherein the device comprises:
- a solenoid configured to selectively close or open the vent;
- a sensor configured to sense the g-forces and generate a signal indicative of the sensed g-forces; and
- a controller configured to receive the signal indicative of the sensed g-forces and to actuate the solenoid to open the vent when the sensed g-forces exceed the first predetermined threshold magnitude.

9. The engine of claim 8, wherein the sensor is configured to generate the signal for a duration of the sensed g-forces, and the controller is configured to actuate the solenoid when the g-forces are above a second predetermined threshold magnitude and the duration of the g-forces above the second predetermined threshold magnitude exceeds a predetermined duration.

10. The engine of claim 9, wherein the sensor is configured to sense a direction of the g-forces and to generate a signal indicative of the direction of the g-forces; the controller being configured to actuate the solenoid when the g-forces in a particular direction exceed the second predetermined threshold magnitude.

11. A method for maintaining oil pressure inside an engine of a motor vehicle, the method comprising:
- receiving oil via an oil pump having a vent;
- closing the vent via a device when the engine is subjected to g-forces up to a first predetermined threshold magnitude;
- opening the vent via the device to purge air from the pump when the engine is subjected to g-forces that are above the first predetermined threshold magnitude, thereby maintaining oil pressure to the engine;
- pressurizing oil via the oil pump; and
- supplying pressurized oil via the oil pump to the engine.

12. The method of claim 11, wherein the closing and opening of the vent is via a solenoid, and further comprising:
- sensing the g-forces and generating a signal indicative of the sensed g-forces via a sensor;
- receiving the signal indicative of the sensed g-forces via a controller; and
- actuating the solenoid via the controller to open the vent when the g-forces exceed the first predetermined threshold magnitude.

13. The method of claim 12, further comprising:
- generating the signal for a duration of the sensed g-forces via the sensor; and
- actuating the solenoid via the controller when the g-forces are above a second predetermined threshold magnitude and the duration of the g-forces above the second predetermined threshold magnitude exceeds a predetermined duration.

14. The engine lubrication system of claim 13, further comprising:
- sensing direction of the g-forces via the sensor;
- generating a signal indicative of the direction of the g-forces via the controller; and
- actuating the solenoid via the controller when the g-forces in a particular direction exceed the second predetermined threshold magnitude.

* * * * *